(12) United States Patent
Ivarson

(10) Patent No.: US 11,380,153 B2
(45) Date of Patent: Jul. 5, 2022

(54) SYSTEM FOR RECEIVING DELIVERY ITEMS AND METHOD THEREFOR

(71) Applicant: James Kenneth Ivarson, Calgary (CA)

(72) Inventor: James Kenneth Ivarson, Calgary (CA)

(73) Assignee: James Kenneth Ivarson, Calgary (CA)

( * ) Notice: Subject to any disclaimer, the term of this patent is extended or adjusted under 35 U.S.C. 154(b) by 0 days.

(21) Appl. No.: 16/703,651

(22) Filed: Dec. 4, 2019

(65) Prior Publication Data

US 2020/0312073 A1 Oct. 1, 2020

Related U.S. Application Data

(60) Provisional application No. 62/823,955, filed on Mar. 26, 2019.

(51) Int. Cl.
| | |
|---|---|
| *G07F 11/62* | (2006.01) |
| *G07C 9/33* | (2020.01) |
| *G07C 9/00* | (2020.01) |
| *G06K 7/14* | (2006.01) |
| *G07C 9/20* | (2020.01) |
| *H04N 7/18* | (2006.01) |
| *E05B 43/00* | (2006.01) |
| *E05B 47/00* | (2006.01) |
| *H04N 5/232* | (2006.01) |
| *G06Q 10/08* | (2012.01) |

(52) U.S. Cl.
CPC ............. *G07C 9/33* (2020.01); *E05B 43/005* (2013.01); *E05B 47/0001* (2013.01); *G06K 7/1417* (2013.01); *G07C 9/00912* (2013.01); *G07C 9/20* (2020.01); *H04N 5/23218* (2018.08); *H04N 7/188* (2013.01); *E05B 2047/0072* (2013.01); *E05Y 2400/85* (2013.01); *G06Q 10/083* (2013.01)

(58) Field of Classification Search
CPC ........ G07C 9/33; G07C 9/20; G07C 9/00912; G07C 9/00563; G07C 9/00896; H04N 5/23218; H04N 7/188; E05B 43/005; E05B 47/0001; E05B 2047/0072; G06K 7/1417; G06K 9/00288; G06K 9/00832; G06K 9/0028; E05Y 2400/85; G06Q 10/083; G06Q 10/08; G06Q 10/0836; G06Q 10/087; G07F 11/62; G07F 17/10; G07F 7/08
See application file for complete search history.

(56) References Cited

U.S. PATENT DOCUMENTS

| | | | | |
|---|---|---|---|---|
| 10,255,737 | B1* | 4/2019 | Eichenblatt | G07C 9/37 |
| 10,861,265 | B1* | 12/2020 | Merkley | G06K 9/78 |
| 2015/0235493 | A1* | 8/2015 | Hall | G07C 9/00571 |
| | | | | 340/5.71 |

(Continued)

*Primary Examiner* — Patrick E Demosky
(74) *Attorney, Agent, or Firm* — Gowling WLG (Canada) LLP

(57) ABSTRACT

A parcel-lock system and methods for securely receiving delivery items or parcels. The system has an electronically controllable parcel-lock on a door of an enclosure. The parcel lock stores one or more unlocking codes such as QR codes or barcodes. When the parcel lock receives an access code matching one of the unlocking codes, the parcel lock unlocks the door to allow the deposition of the delivery items, and starts video-recording using a front and a rear camera thereof. The parcel lock also continuously plays a beeping sound during the time the door is open.

19 Claims, 10 Drawing Sheets

(56) References Cited

U.S. PATENT DOCUMENTS

| | | | | |
|---|---|---|---|---|
| 2015/0310381 A1* | 10/2015 | Lyman | ................ | G06Q 10/083 |
| | | | | 705/330 |
| 2017/0034485 A1* | 2/2017 | Scalisi | ................... | H04N 7/186 |
| 2019/0325681 A1* | 10/2019 | Bresson | ............ | G07C 9/00174 |
| 2020/0397172 A1* | 12/2020 | Kennett | ................. | E05B 65/52 |
| 2021/0160462 A1* | 5/2021 | Bashkin | ............ | G06K 9/00288 |

* cited by examiner

SYSTEM FOR RECEIVING DELIVERY ITEMS AND METHOD THEREFOR

CROSS-REFERENCE TO RELATED APPLICATIONS

This application claims the benefit of U.S. Provisional Patent Application Ser. No. 62/823,955, filed Mar. 26, 2019, the content of which is incorporated herein by reference in its entirety.

FIELD OF THE DISCLOSURE

The present disclosure relates generally to a system and method for securely receiving delivery items such as parcels, and in particular, to a system and method for securely receiving the delivery items without attendance of the recipient.

BACKGROUND

It has been a challenge for securely receiving a parcel delivered to an address which generally requires the recipient to be present at the address for personally receiving the parcel. When the recipient is unavailable to personally receive the parcel, the parcel may be left unattended at the address thereby causing the risk of theft. Alternatively, the parcel may be withheld by the courier for next delivery attempt or the recipient may need to pick up the parcel at another location, both of which lead to waste of the courier's and/or recipient's time and effort, and also lead to extended waiting time for the recipient to receive the parcel.

A method of parcel delivery without the recipient's attendance is to use a separate lockable enclosure such as a community storage box for which both the courier and the recipient have keys or access codes thereof. However, this method has some disadvantages. For example, such enclosures are usually located away from the recipient's home and thus inconvenient for the recipient to access. Moreover, such enclosures are usually of small sizes as it is generally uneconomical to build and set up enclosures of large sizes for the sole purpose of receiving delivery items. Consequently, such enclosures cannot be used for receiving large-size delivery items.

SUMMARY

According to one aspect of this disclosure, there is provided an apparatus for receiving one or more delivery items into an enclosure having a lockable door at an entrance thereof. The apparatus comprises: a front input structure installable on a first side of the lockable door corresponding to an exterior of the enclosure; a first imaging component for installing on a second side of the lockable door corresponding to an interior of the enclosure; an actuation structure for locking and unlocking the lockable door; and a control circuitry for functionally coupling to the first imaging component, the front input structure, and the actuation structure. The control circuitry is configured for: storing one or more unlocking codes; receiving an access code from a visitor via the front input structure; determining that the access code corresponds to one of the one or more unlocking codes; commanding the actuation structure to unlock the lockable door for receiving the one or more delivery items into the enclosure; and activating the first imaging component for monitoring the entrance and at least a first portion of the exterior of the enclosure adjacent a first side of the entrance.

In one embodiment, the control circuitry is further configured for: determining that the access code does not correspond to any one of the one or more unlocking codes; and generating a first error output.

In one embodiment, at least one of the access code and the one or more unlocking codes is a tracking number of one of the one or more delivery items or is a code encoded from the tracking number.

In one embodiment, the front input structure comprises at least one of a second imaging component for detecting an image encoding the access code, and a first keyboard for entering the access code.

In one embodiment, the apparatus further comprises a third imaging component installable on the first side of the lockable door for functionally coupling to the control circuitry for monitoring a second portion of the exterior of the enclosure.

In one embodiment, at least one of the first and the third imaging components is a wide-angle camera or a fisheye camera.

In one embodiment, the apparatus further comprises at least one of a front display for displaying user instructions to the visitor, a motion sensor, a first speaker, and a first microphone, installable on the first side of the lockable door.

In one embodiment, the control circuitry is configured for activating at least one of the first and the third imaging components when the motion sensor detects the visitor in proximity with the lockable door.

In one embodiment, the front display is a touchscreen; and the first keyboard is a virtual keyboard displayed on the front display.

In one embodiment, the apparatus further comprises a rear input structure for receiving one or more codes for generating the one or more unlocking codes, said rear input structure being installable on the second side of the lockable door.

In one embodiment, the rear input structure comprises at least one of a fourth imaging component for detecting one or more images containing information associated with the one or more unlocking codes, and a second keyboard for entering the information associated with the one or more unlocking codes.

In one embodiment, the apparatus further comprises at least one of a rear display for displaying images captured by the third imaging component, a second speaker, and a second microphone, installable on the second side of the lockable door.

In one embodiment, the rear display is a touchscreen; and the second keyboard is a virtual keyboard displayed on the rear display.

In one embodiment, the apparatus further comprises a door-status detection structure for detecting a status of the lockable door.

In one embodiment, the door-status detection structure comprises a door-status sensor and a mark detectable by the door-status sensor; and one of the door-status sensor and the mark is installable on the lockable door and the other one of the door-status sensor and the mark is installable on a doorjamb associated with the lockable door.

In one embodiment, the control circuitry is configured for monitoring a predefined area in the enclosure accessible to the visitor and for generating a second error output if the visitor in the predefined area has moved out of the predefined area.

In one embodiment, the lockable door is upwardly openable; and the control circuitry is configured for monitoring the predefined area in the enclosure using the first imaging component.

In one embodiment, the apparatus further comprises a fifth imaging component installable in the enclosure, the fifth imaging component functionally coupled to the control circuitry for monitoring the predefined area in the enclosure.

In one embodiment, the control circuitry is configured for commanding the actuation structure to lock the lockable door after a predefined period of time since said unlocking the lockable door.

In one embodiment, the predefined period of time is customizable.

In one embodiment, the control circuitry is further configured for: determining, after said locking the lockable door, whether the lockable door is closed; and if the door is not closed, generating a third error output.

In one embodiment, the control circuitry comprises a timer for counting the predefined period of time.

In one embodiment, the control circuitry is further configured for: restarting the timer if another access code is inputted.

In one embodiment, the control circuitry is further configured for: disabling the access code from future use.

In one embodiment, the control circuitry is further configured for: receiving from a user an instruction of reusing the access code; and allowing the access code for future use.

In one embodiment, the control circuitry is further configured for: generating a continuous sound when the lockable door is open; and stopping the continuous sound when the lockable door is closed.

In one embodiment, the control circuitry is further configured for: checking, before said unlocking the lockable door, whether another door of the enclosure is locked; and locking the another door if the another door is not locked.

In one embodiment, the control circuitry is further configured for: monitoring the visitor in the enclosure; and closing the lockable door when the visitor is not detected in the enclosure.

According to one aspect of this disclosure, there is provided a system for receiving one or more delivery items into an enclosure having a lockable door at an entrance thereof. The system comprises: one or more computing devices; and a locking apparatus installed on the lockable door. The locking apparatus comprises: a communication interface for communicating with the one or more computing devices through a network; a front input structure installed on a first side of the lockable door corresponding to an exterior of the enclosure; a first imaging component installed on a second side of the lockable door corresponding to an interior of the enclosure; an actuation structure for locking and unlocking the lockable door; and a control circuitry for functionally coupling to the communication interface, the first imaging component, the front input structure, and the actuation structure. The control circuitry is configured for: receiving one or more unlocking codes from the one or more computing devices via the communication interface; storing the one or more unlocking codes; receiving an access code via the front input structure; determining that the access code corresponds to one of the one or more unlocking codes; commanding the actuation structure to unlock the lockable door for receiving the one or more delivery items into the enclosure; and activating the first imaging component for monitoring the entrance and at least a first portion of the exterior of the enclosure adjacent a first side of the entrance.

According to one aspect of this disclosure, there is provided a method for receiving one or more delivery items into an enclosure having a lockable door at an entrance thereof. The method comprises: storing one or more unlocking codes; receiving an access code from a visitor; determining that the access code corresponds to one of the one or more unlocking codes; unlocking the lockable door for receiving the one or more delivery items into the enclosure; and monitoring the entrance and at least a first portion of the exterior of the enclosure adjacent a first side of the entrance.

In one embodiment, the method further comprises: determining that the access code does not correspond to any one of the one or more unlocking codes; and generating a first error output.

In one embodiment, the method further comprises: generating at least one of the access code and the one or more unlocking codes based on a tracking number.

In one embodiment, said receiving the access code comprises: detecting an image encoding the access code.

In one embodiment, the method further comprises: monitoring a second portion of the exterior of the enclosure.

In one embodiment, at least one of said monitoring the entrance and at least the first portion of the exterior of the enclosure adjacent the first side of the entrance and said monitoring the second portion of the exterior of the enclosure is activated after the visitor is detected in proximity with the lockable door.

In one embodiment, the method further comprises: providing a virtual keyboard displayed on a touchscreen for receiving the access code.

In one embodiment, the method further comprises: receiving one or more codes for generating at least one of the access code and the one or more unlocking codes.

In one embodiment, said receiving the access code comprises: detecting one or more images encoding the one or more codes.

In one embodiment, the method further comprises: monitoring a predefined area in the enclosure accessible to the visitor; and generating a second error output if the visitor in the predefined area has moved out of the predefined area.

In one embodiment, the method further comprises: counting for a predefined period of time after said unlocking the lockable door; and locking the lockable door after the predefined period of time.

In one embodiment, the method further comprises: determining, after said locking the lockable door, whether the lockable door is closed; and if the door is not closed, generating a third error output.

In one embodiment, the method further comprises: restarting the counting for the predefined period of time if another access code is inputted.

In one embodiment, the method further comprises: disabling the access code from future use.

In one embodiment, the method further comprises: receiving from a user an instruction of reusing the access code; and allowing the access code for future use.

In one embodiment, the method further comprises: generating a continuous sound when the lockable door is open; and stopping the continuous sound when the lockable door is closed.

In one embodiment, the method further comprises: checking, before said unlocking the lockable door, whether another door of the enclosure is locked; and locking the another door if the another door is not locked.

In one embodiment, the method further comprises: monitoring the visitor in the enclosure; and closing the lockable door when the visitor is not detected in the enclosure.

According to one aspect of this disclosure, there is provided one or more non-transitory computer-readable storage devices comprising computer-executable instructions for receiving one or more delivery items into an enclosure having a lockable door at an entrance thereof. The instructions, when executed, cause a processing structure to perform actions comprising: storing one or more unlocking codes; receiving an access code from a visitor; determining that the access code corresponds to one of the one or more unlocking codes; unlocking the lockable door for receiving the one or more delivery items into the enclosure; and monitoring the entrance and at least a first portion of the exterior of the enclosure adjacent a first side of the entrance.

In one embodiment, the instructions, when executed, cause the processing structure to perform further actions comprising: determining that the access code does not correspond to any one of the one or more unlocking codes; and generating a first error output.

In one embodiment, the instructions, when executed, cause the processing structure to perform further actions comprising: generating at least one of the access code and the one or more unlocking codes based on a tracking number.

In one embodiment, said receiving the access code comprises: detecting an image encoding the access code.

In one embodiment, the instructions, when executed, cause the processing structure to perform further actions comprising: monitoring a second portion of the exterior of the enclosure.

In one embodiment, at least one of said monitoring the entrance and at least the first portion of the exterior of the enclosure adjacent the first side of the entrance and said monitoring the second portion of the exterior of the enclosure is activated after the visitor is detected in proximity with the lockable door.

In one embodiment, the instructions, when executed, cause the processing structure to perform further actions comprising: providing a virtual keyboard displayed on a touchscreen for receiving the access code.

In one embodiment, the instructions, when executed, cause the processing structure to perform further actions comprising: receiving one or more codes for generating at least one of the access code and the one or more unlocking codes.

In one embodiment, said receiving the access code comprises: detecting one or more images encoding the one or more codes.

In one embodiment, the instructions, when executed, cause the processing structure to perform further actions comprising: monitoring a predefined area in the enclosure accessible to the visitor; and generating a second error output if the visitor in the predefined area has moved out of the predefined area.

In one embodiment, the instructions, when executed, cause the processing structure to perform further actions comprising: counting for a predefined period of time after said unlocking the lockable door; and locking the lockable door after the predefined period of time.

In one embodiment, the instructions, when executed, cause the processing structure to perform further actions comprising: determining, after said locking the lockable door, whether the lockable door is closed; and if the door is not closed, generating a third error output.

In one embodiment, the instructions, when executed, cause the processing structure to perform further actions comprising: restarting the counting for the predefined period of time if another access code is inputted.

In one embodiment, the instructions, when executed, cause the processing structure to perform further actions comprising: disabling the access code from future use.

In one embodiment, the instructions, when executed, cause the processing structure to perform further actions comprising: receiving from a user an instruction of reusing the access code; and allowing the access code for future use.

In one embodiment, the instructions, when executed, cause the processing structure to perform further actions comprising: generating a continuous sound when the lockable door is open; and stopping the continuous sound when the lockable door is closed.

In one embodiment, the instructions, when executed, cause the processing structure to perform further actions comprising: checking, before said unlocking the lockable door, whether another door of the enclosure is locked; and locking the another door if the another door is not locked.

In one embodiment, the instructions, when executed, cause the processing structure to perform further actions comprising: monitoring the visitor in the enclosure; and closing the lockable door when the visitor is not detected in the enclosure.

DETAILED DESCRIPTION

Figure 1:
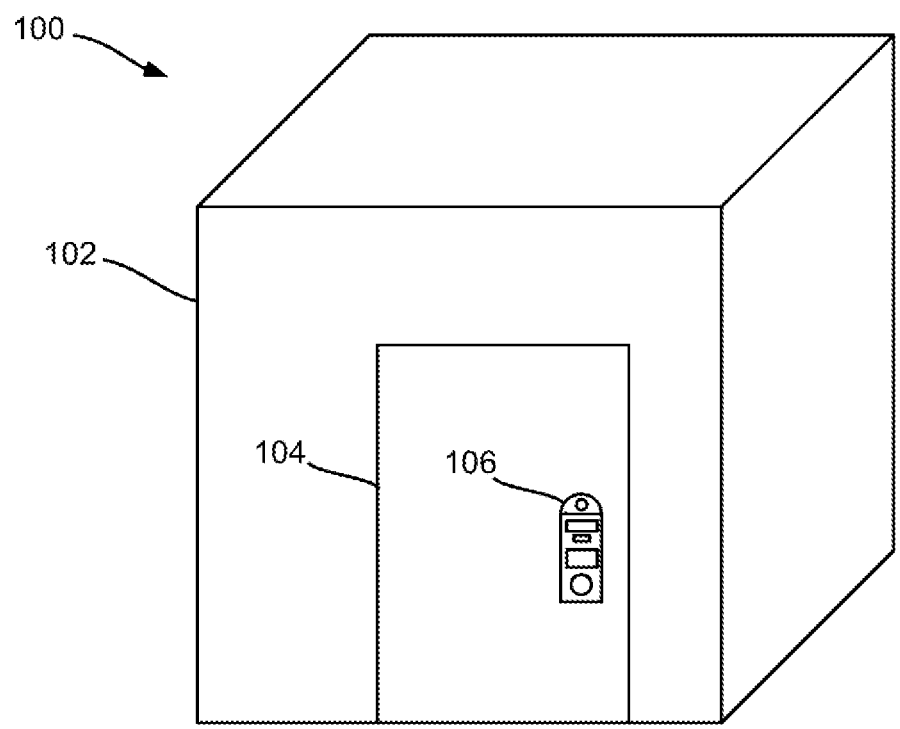
FIG. 1 is a perspective view of a parcel-lock system having a parcel lock installed on a lockable door of an enclosure for securely receiving delivery items, according to one embodiment of this disclosure, wherein the lockable door is in a closed position.
Figure 2:
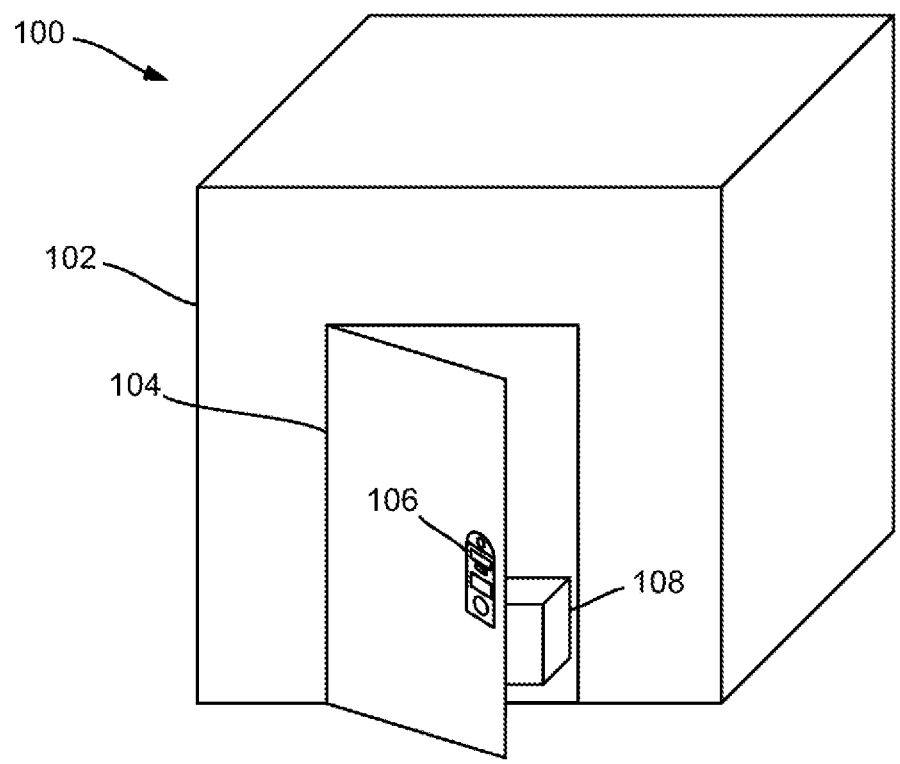
FIG. 2 illustrates a perspective view of the parcel-lock system shown in FIG. 1 with the lockable door in an open position for receiving a parcel.

Turning now to FIGS. 1 and 2, a parcel-lock system is shown and is generally identified using reference numeral 100. The parcel-lock system 100 in this embodiment is installed on a lockable door 104 of an enclosure 102 for controlling the access of the enclosure 102 for receiving one or more parcels 108. Herein, the enclosure 102 may be a container, a room, a house, a garage, or the like. The lockable door 104 may be any door suitable for installing onto the enclosure 102 and may be made of any suitable material. For example, the lockable door 104 may be a swing door, a sliding door, a roll-up door (e.g., a garage door), or the like. The parcel 108 may be any delivery item or goods of various sizes suitable for delivering into the enclosure 102.

The parcel-lock system 100 comprises a parcel lock 106 installed on the lockable door 104 for locking and unlocking the lockable door 104. In this embodiment, the lockable door 104 is normally closed and locked by the parcel lock 106, as shown in FIG. 1. In FIG. 2, the lockable door 104 is open and unlocked and a parcel 108 is deposited into the enclosure 102.

The parcel lock 106 is an electronically controllable lock that may be installed on any suitable location of the lockable door 104, for example, adjacent to a doorknob or key-lock on a standard house door 104. Those skilled in the art will appreciate that, in various embodiments, the location of the parcel lock 106 on the lockable door 104 may vary depending on the implementation of the parcel-lock system 100 and/or the type of the lockable door 104.

Figure 3:
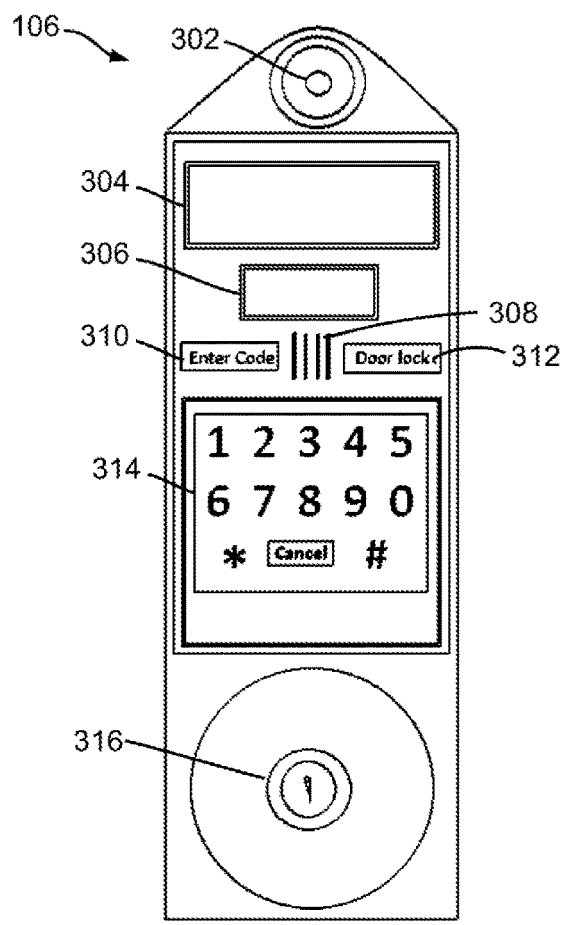
FIG. 3 is a front view of the parcel lock of the parcel-lock system shown in FIG. 1, showing a front side thereof corresponding to an exterior side of the enclosure.
Figure 4:
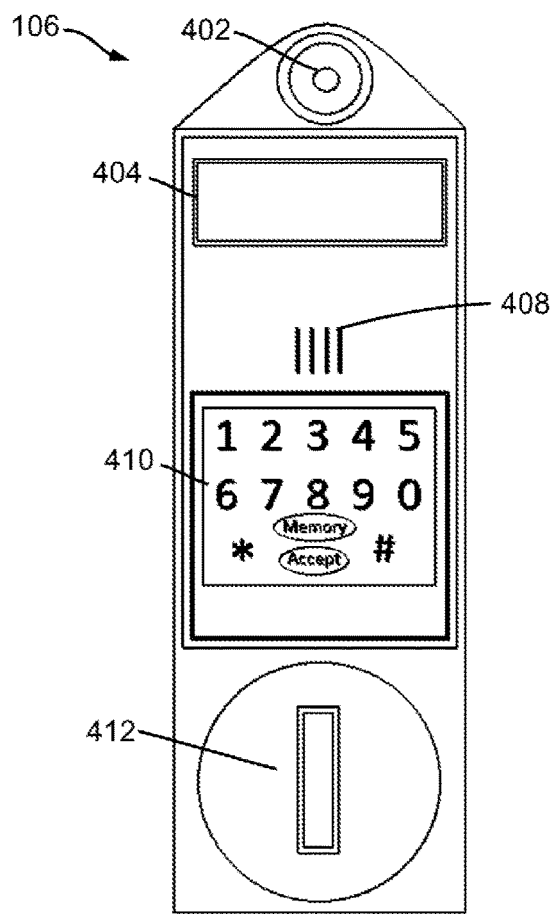
FIG. 4 is a rear view of the parcel lock shown in FIG. 3, showing a rear side thereof corresponding to an interior side of the enclosure.

Turning now to FIGS. 3 and 4. FIG. 3 is a front view of the parcel lock 106 viewed from a front side thereof corresponding to an exterior side of the enclosure 102 when the parcel lock 106 is installed on the lockable door 104 of the enclosure 102. FIG. 4 is a rear view of the parcel lock 106 viewed from a rear side thereof corresponding to an interior side of the enclosure 102 when the parcel lock 106 is installed on the lockable door 104 of the enclosure 102.

As shown in FIGS. 3 and 4, the parcel lock 106 comprises a front scanner 304 on the front side thereof for scanning a two-dimensional barcode such as a Quick Response (QR) code, a one-dimensional barcode (sometime simply denoted as a barcode), or other suitable types of access code associated with the parcel 108. The scanner 304 may alternatively be any other suitable user input structure, such as an optical component or an imaging device (e.g., a camera) capable of capturing and recognizing an optical code, a visible code, a bar code, a QR code or the like.

In this embodiment, the parcel lock 106 also comprises a front keypad 314 (also generally denoted a front "keyboard") on the front side thereof for receiving a manual input of an access code such as a tracking number. The front keypad 314 shown in FIG. 3 is illustrated as a twelve-button numeric keypad. However, the front keypad 314 may alternatively be other suitable user input structure or interactive user interface. For example, in one embodiment, the front keypad 314 may be a touchscreen displaying user instructions and a digital keyboard for inputting numbers, letters, and/or other characters.

In this embodiment, the parcel lock 106 further comprises a motion sensor 306 on the front side thereof for sensing a moving object such as a visitor in proximity with the lockable door 104 and subsequently activating a front video camera 302 on the front side thereof and a rear video camera 402 on a rear side thereof to start recording the activity of the courier. The visitor may be a courier, a delivery person, an intruder or any other person. The video cameras 302 and 402 may be any imaging devices such as video cameras, camcorders, surveillance cameras, web cams, and/or the like suitable for capturing video streams or a series of images of the visitor.

In this embodiment, the parcel lock 106 further comprises a front microphone and speaker assembly 308 for the courier to communicate with the recipient or homeowner (if the enclosure 102 is installed in a home or is a part of the home). The front microphone and speaker assembly 308 may transmit the courier's voice to a microphone and speaker assembly 408 on the rear side of the parcel lock 106. Alternatively, if the enclosure 102 is installed in a home or is a part of the home, the microphone and speaker assembly 308 may transmit the courier's voice to a microphone and speaker assembly (not shown) in another location of the home. Yet alternatively, the microphone and speaker assembly 308 may transmit the courier's voice to the recipient's personal electronic device such as a smartphone via a necessary network infrastructure.

In one embodiment, the courier may request to communicate with the recipient or homeowner by pressing a "CALL" push button (not shown) or a door-bell button coupled to the parcel lock 106. In another embodiment, the microphone and speaker assembly 308 may be activated only by the recipient, either by pressing an "ANSWER" button (not shown) inside the enclosure 102 or remotely by using his or her personal electronic device.

On the front side thereof, the parcel lock 106 may optionally comprise various push buttons. For example, an "Enter Code" button 310 may be used to activate the front keypad 314 or front scanner 304 for receiving an access code. A "Door Lock" button 312 may be used to lock the door 104 after the courier deposits the parcel 108 into the enclosure 102 and closes the lockable door 104. As mentioned above, a "CALL" push button may be used for courier to communicate with the recipient. In various embodiments, such push buttons do not have to be separated from the front keypad 314. For example, in some embodiments wherein the front keypad 314 is a touchscreen, the front keypad 314 may incorporate the functions of above-described push buttons as selectable menu items or touchable virtual buttons.

As shown in FIG. 3, the parcel lock 106 may further comprise a conventional door-lock actuation structure comprising a cylinder 316 having a keyhole for receiving and engaging a key (not shown) for manually locking and unlocking the lockable door 104, and a bolt for engaging a bolt receiver (on doorjamb) for locking the door 104.

As shown in FIG. 4, on the rear side thereof, the parcel lock 106 comprises a rear video camera 402 same as or similar to the front video camera 302. In this embodiment, the parcel lock 106 also comprises a rear scanner 404 same as or similar to the front scanner 304 for scanning a QR code, a barcode, or other types of optical code associated with the parcel 108 such that the recipient may use the rear scanner 404 to manually scan an unlocking code and program the unlocking code into the parcel lock 106. Similar to front scanner 304, the rear scanner 404 may alternatively be any other suitable optical input structure. For example, an optical component or imaging device (e.g., a camera) capable of capturing and recognizing an optical code, a visible code, a bar code, a QR code, or the like.

In this embodiment, the parcel lock 106 further comprises a rear keypad 410 same as or similar to the front keypad 314. Again, the rear keypad 410 is illustrated in FIG. 4 as a twelve-button numeric keypad but may be of other suitable input structure or interactive user interface such as a touchscreen displaying a digital keyboard for inputting numbers, letters, and/or other characters. The recipient may use the rear keypad 410 to manually input and program the unlocking code (e.g., a tracking number) into the parcel lock 106 for generating an access code for the courier to use. The recipient is also allowed to send, store and program the unlocking code using his or her personal electronic device such as a smartphone. In this embodiment, the parcel lock 106 further comprises a microphone and speaker assembly 408 on the rear side thereof that is the same as or similar to the microphone and speaker assembly 308. As described above, the microphone and speaker assembly 408 allows the recipient to communicate with the courier outside the door 104.

The parcel lock 106 may also comprise image-displaying devices (not shown in FIG. 4). A rear image-displaying device may be used to display images captured by the front camera 302. A front image-displaying device (which may be the touchscreen or alternatively a separate screen) may be used to display instructions to a visitor As shown in FIG. 4, the parcel lock 106 may further comprise, as part of the conventional lock structure, a thumb-turn or turn-lock 412 on the rear side thereof for the recipient to manually lock and unlock the door 104.

Figure 5:
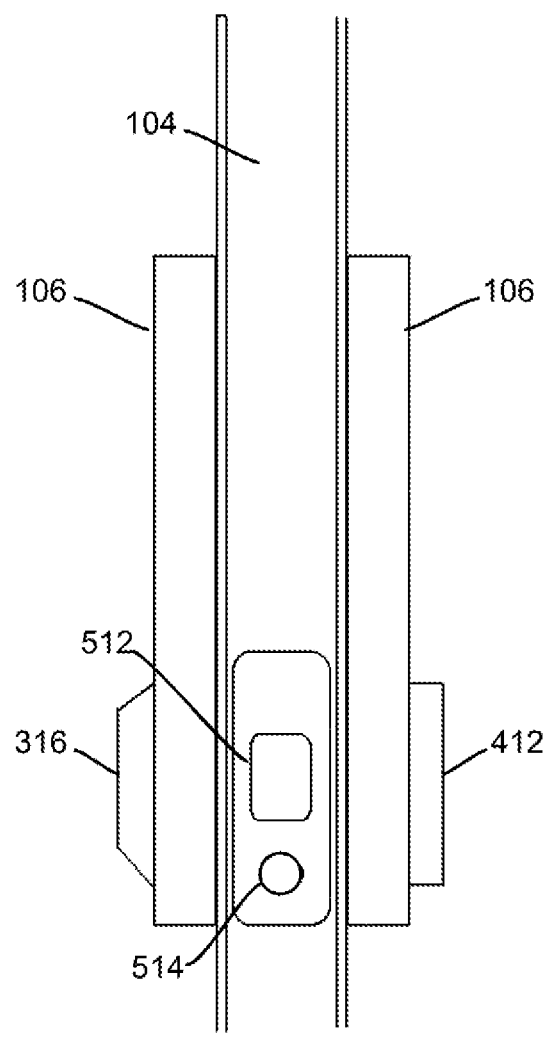
FIG. 5 is a side view of the parcel lock shown in FIG. 3 installed about an outer edge of the lockable door.
Figure 6:
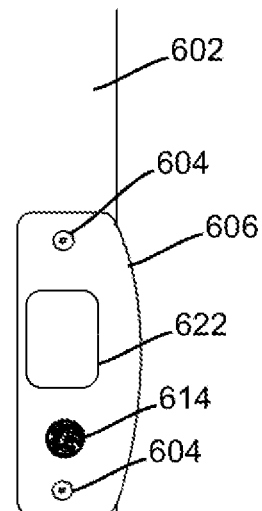
FIG. 6 is a side view of a doorjamb of a doorframe receiving the lockable door for collaborating with the parcel lock shown in FIG. 3 to lock and unlock the door.

Turning now to FIGS. 5 and 6, the parcel lock 106 is installed on the lockable door 104 about an outer edge thereof with improved security features to ensure the door 104 is properly closed. In this example, the lockable door 104 may be a swing door or a sliding door.

FIG. 5 is a side view of the parcel lock 106 on the lockable door 104. As can be seen, the parcel lock 106 is installed about an outer edge of the lockable door 104 and may electrically and/or manually (via a key (not shown) through the cylinder 316 from the exterior side or via the thumb-turn 412 from the interior side) actuate a deadbolt 512 between an extended position and a retracted position to lock and unlock the lockable door 104. FIG. 6 is a side view of the corresponding doorjamb 602 of the doorframe receiving the lockable door 104. As shown, the doorjamb 602 comprising a strike plate 606 secured thereon by two or more tamper-proof screws 604. The strike plate 606 comprises a recess or deadbolt receiver 612 for receiving the deadbolt 512 when the lockable door 104 is closed and the deadbolt 512 is in the extended position.

As shown in FIGS. 5 and 6, the parcel-lock system 100 also comprises a door-status detection structure to check whether the door 104 is open or closed which comprises a unique micro-mark 614 on the doorjamb 602 and a mark sensor 514 on a corresponding position of the lockable door 104. Mark sensor 514 is used for sensing or reading the mark 614 to ensure the lockable door 104 is properly closed. Preferably, the mark 614 is invisible or hardly visible to human eyes which makes it more difficult to replicate or mimic thereby providing increased security. In this embodiment, the mark sensor 514 is located on the lockable door 104 below the deadbolt 512 and the mark 614 is located on the strike plate 606 below the deadbolt receiver 612. However, those skilled in the art will appreciate that the mark sensor 514 may be located at any suitable location on the side of lockable door 104 and the mark 614 may be located at corresponding location on the doorjamb 602 substantially aligning with the mark sensor 514. In this embodiment, the micro-mark 614 is an optical mark and the mark sensor 514 is an imaging device.

Figure 7:
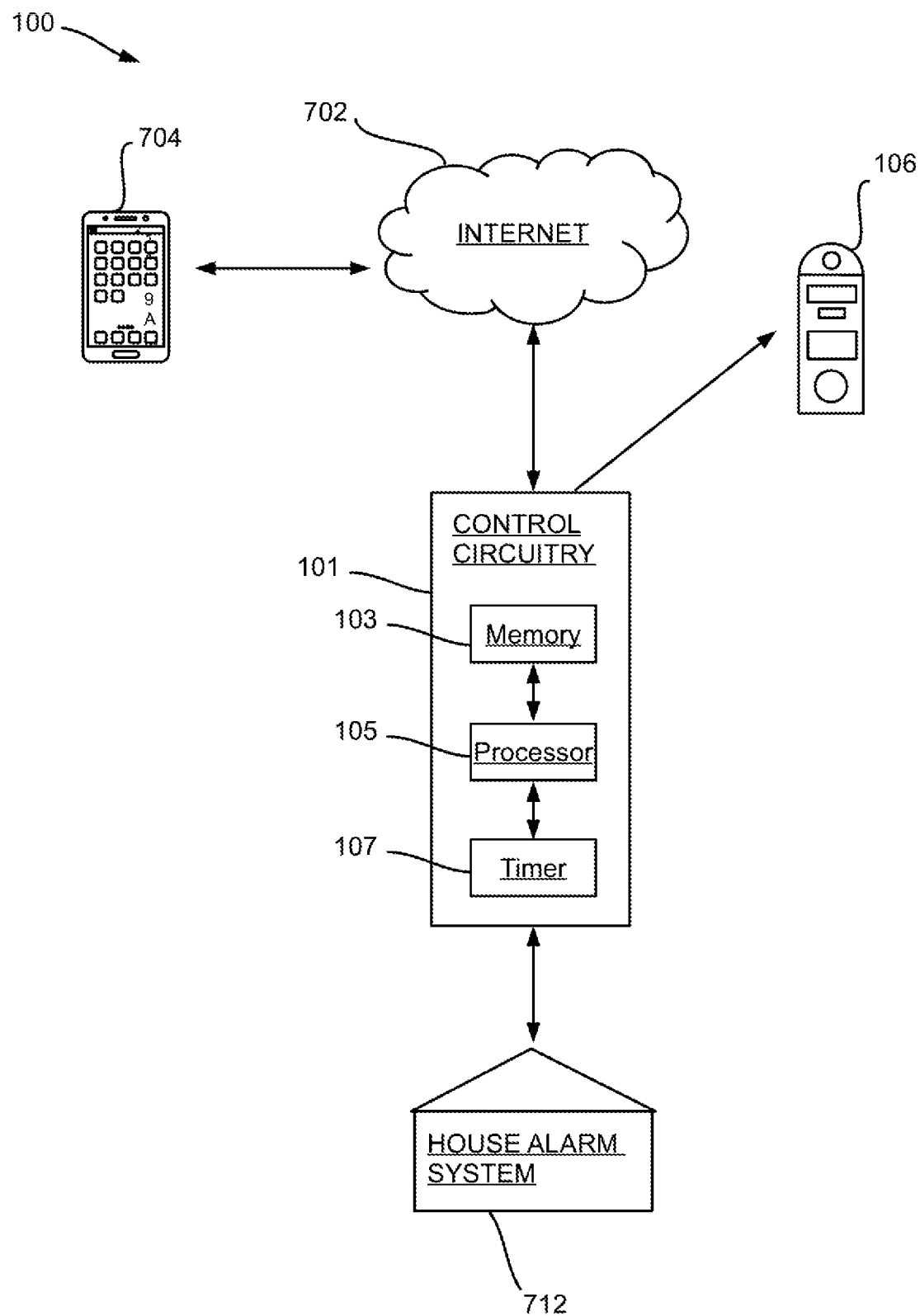
FIG. 7 is a schematic diagram showing a control structure of the parcel-lock system shown in FIG. 1.

FIG. 7 is a schematic diagram showing a control structure of the parcel-lock system 100. The parcel lock system 100 comprises a control circuitry 101 on the parcel lock 106. The control circuitry 101 comprises an internal memory 103 for storing data and instructions, a processor 105 functionally coupled to the memory to execute instructions, and a timer 107. The control circuitry 101 receives and stores inputs from various components of the parcel lock 106 such as scanners 304 and 404, keypads 314 and 410, speakers 308 and 408, the motion sensor 306, video cameras 302 and 402, and push buttons 310 and 312, and controls the parcel lock 106 to interact with users such as the recipient and the courier.

The control circuitry 101 in this embodiment also comprises a wired or wireless networking module (not shown) to connect to a network 702 such as the Internet to receive instructions from the recipient's personal electronic device 704 and/or send information thereto. The electronic device 704 may be a computer, a laptop, a smartphone, or other suitable personal electronic devices accessible through the network 702.

When an item (e.g., an item purchased online or in store by the recipient or a third party) to be delivered to the recipient, an identification code for identifying the item, such as a tracking code, a QR code, a barcode, or other suitable type of code, is generated by the delivery-service provider or by a related party such as the seller of the item and is sent to the control circuitry 101. The control circuitry 101 receives and stores the identification code and generates an unlocking code and an access code based on the identification code. For example, the control circuitry 101 may generate the unlocking code and the access code by encoding the received identification code. Alternatively, the control circuitry 101 may use the received identification code as the access code and generate the unlocking code based on the received identification code, or the control circuitry 101 may simply use the received identification code as the unlocking code and the access code. When the item is delivered, the courier needs to provide the access code matching the unlocking code to open the lockable door 104 of the enclosure 102 for depositing the item into the enclosure 102.

The control circuitry 101 may also send information to the recipient's personal electronic device 704. Such information may be video and/or audio recorded by cameras 302 and 402 and speakers 308 and 408. The control circuitry 101 may send the information to the recipient's personal electronic device 704 via email, text message, or other suitable communication means.

The control circuitry 101 may receive instructions from the recipient or courier through their direct interactions with the parcel lock 106, such as via the keypads 314 and 410, scanners 304 and 404, and microphone-speaker assemblies 308 and 408. For example, the control circuitry 101 may receive a code manually inputted by the recipient using the scanner 404 or keypad 410, store the received code as an unlocking code, and then generate an access code based on the received code. As another example, the control circuitry 101 may receive inputs from the courier by scanning an access code using the scanner 304 or by inputting an access code using the front keypad 314 to unlock the lockable door 104. The control circuitry 101 may also receive signals from the motion sensor 306 to activate video cameras 302 and 402 to start video-recording. The control circuitry 101 also controls when video cameras 302 and 402 stop video-recording. The control circuitry 101 communicates with the mark sensor 614 to determine whether the lockable door 104 is closed and respond to the status of the lockable door 104 accordingly.

The control circuitry 101 may also be programmed with or coupled to a house alarm system 712. For example, the control circuitry 101 may be connected to an existing sound alarm system or security video cameras inside and around the house. The control circuitry 101 may also turn on or off the house alarm system as needed.

The control circuitry 101 controls the parcel lock 106 to lock and unlock the lockable door 104. In particular, the control circuitry 101 controls a motor or servo (not shown) to actuate the deadbolt 512 to the extended or retracted position to lock or unlock the lockable door 104. The recipient is thus able to remotely control the opening/closing and unlocking/locking of the lockable door 104 by communicating with the control circuitry 101 using recipient's personal electronic device 704.

Figure 8:
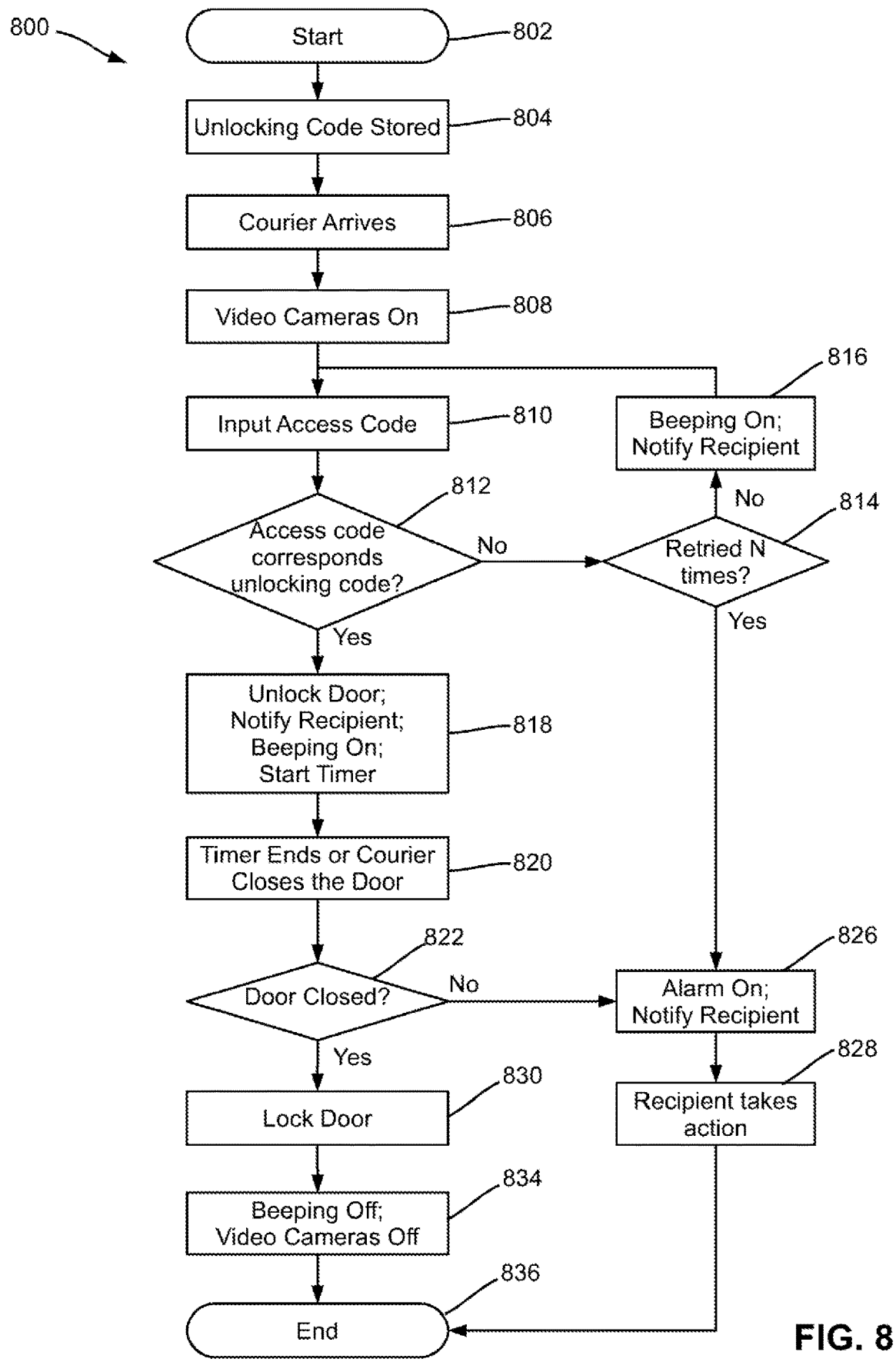
FIG. 8 is a flowchart showing the steps of a process for depositing an item into the enclosure using the parcel-lock system shown in FIG. 1.

FIG. 8 is a flowchart showing the steps of a process 800 for depositing an item into the enclosure 102, according to one embodiment of this disclosure. The process 800 begins when an item is to be delivered to the recipient (step 802). At step 804, an unlocking code is generated and stored in the parcel lock 106. As described above, the unlocking code may be a tracking number, a QR code, a barcode, or other suitable type of code. Alternatively, the unlocking code may be a code generated based on the tracking number, the QR code, the barcode, or the like. To store this code as an unlocking code into control circuitry 101, the recipient may either send the code from his or her personal electronic device 704 to the control circuitry 101 through the network 702, or manually enter or scan the code using the scanner 404 or keypad 410.

When a visitor, such as a courier, arrives at the enclosure 102 (step 806), the motion sensor 306 senses the courier and activates the front and rear video cameras 302 and 402 to start recording the activity of the courier (step 808). The recipient, who may not be nearby, may receive a notification from the parcel-lock system 100 and choose to start viewing the video simultaneously and remotely on his or her personal electronic device 704 such as a smartphone or computer. This may require the recipient to install a software program or app on his or her personal electronic device 704 and/or set up a secure personal account with a password. Similar technologies of simultaneously viewing the video may also be used.

Also referring to FIG. 3, the courier may input an access code by pressing the "Enter Code" push button 310 and then manually entering the access code via the front keypad 314, or by scanning the access code using the front scanner 304 (step 810). The control circuitry 101 verifies the received access code (step 812) and goes to step 818 upon the confirmation that the entered access code corresponds to the unlocking code.

At step 812, if the access code entered by the courier is incorrect, the parcel lock 106 checks if the courier has entered incorrect access codes for a predefined number N of times (step 814), wherein N may be customizable by the recipient in some embodiments. If the courier has entered incorrect access codes for N times, an error is occurred and the process 800 goes to step 826; otherwise, the parcel lock 106 starts to beep (step 816) and the process 800 goes to step 810 to allow the courier to input the access code again. At step 816, the control circuitry 101 may also send a notification message to recipient's personal electronic device 704 to notify the recipient that a person is entering a wrong access code.

At step 818, the control circuitry 101 actuates the deadbolt 512 to the retracted position to unlock the lockable door 104 and sends a notification message to recipient's personal electronic device 704 to notify the recipient that a parcel is being delivered. This notification message may be an email, a text message, or other types of messages. Furthermore, the notification message may be customized according to the unlocking code being inputted. For example, if multiple parcels are to be delivered (see FIG. 10), multiple unlocking codes may be stored in the control circuitry 101 and the nonfiction message may indicate which parcel is being delivered now.

In these embodiments, once an access code been inputted by the courier has matched the unlocking code, the matched unlocking code is disabled and is flagged by the control circuitry 101 as an already-used code such that it can no longer be used. However, if the recipient store or program a previously used code into the parcel lock 106 as a new unlocking code, such an unlocking code is then accepted by the parcel-lock system 100 without being flagged as an already-used code.

At step 818, the control circuitry 101 also starts a timer for counting a pre-defined period of time (which may be recipient-customizable) within which the courier 708 has to open the lockable door 104 and deposit the item into the enclosure 102.

When the courier 708 opens the door, the parcel lock 106 generates a continuous beeping sound through speakers 308 and 408 or other means of sound alarm. Such a beeping sound provides additional security to the system with noticeable warnings to illegal attempts.

When the timer ends (step 820), the control circuitry 101 checks whether the lockable door 104 is closed (step 822). If the mark reader 514 on the lockable door 104 reads the micro-mark 514 on the doorjamb 602, the control circuitry 101 determines that that the lockable door 104 is closed, and then automatically actuate the deadbolt 512 to its extended position to lock the door 104 (step 830).

Alternatively, if the courier completes depositing the item into the enclosure 102 within the pre-defined period of time, the courier may close the lockable door 104 and press the push button "Door Lock" 312 (see FIG. 3). In response, the control circuitry 101 checks whether door 104 is closed (step 822) and if yes, actuate the deadbolt 512 to the extended position to lock the door 104 (step 830). After the door 104 is locked, the beeping sound stops and the front and rear video cameras 302 and 402 are turned off (step 834). The process 800 then ends (step 836) and the control circuitry 101 waits for the next access code input.

At step 822, if the courier fails to close the door before the timer ends, the parcel-lock system 100 determines that an error condition "door not closed" has occurred and the process 800 goes to step 826.

At step 826, the parcel-lock system 100 starts an alarm through its speakers 308 and 408 or through the house alarm system (not shown) and sends an error message to the recipient's personal electronic device 704 via email, text message, or other suitable types of messages. Upon receiving the error message, the recipient 710 may take possible or necessary actions (step 828) such as remotely viewing the courier's activity from video cameras 302 and/or 402, and/or to communicating with the courier using his or her personal electronic device 704 and through the microphone and speakers assembly 308. The recipient may also choose to remotely instruct the control circuitry 101 to close (if a motor for closing the door is installed) and lock the door 104. The recipient may also remotely instruct the control circuitry 101 to re-start the timer to give the courier more time to deposit the parcel into the enclosure 102 and then close the lockable door 104. The process 800 then ends (step 836).

Figure 9:
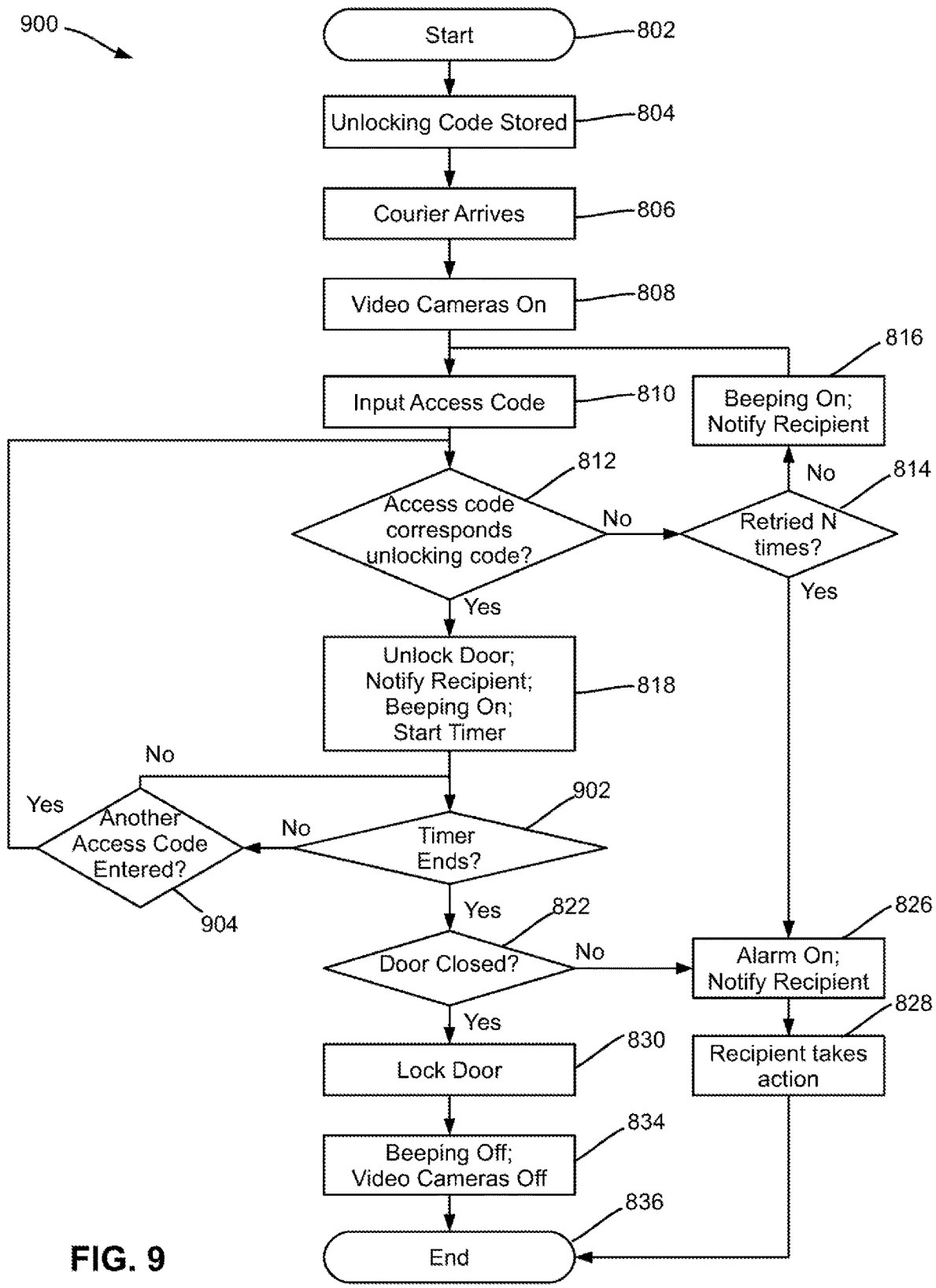
FIG. 9 is a flowchart showing the steps of a process for depositing a plurality of items into the enclosure, according to one embodiment of this disclosure.

FIG. 9 is a flowchart showing the steps of a process 900 for depositing a plurality of items into the enclosure 102, according to one embodiment of the disclosure. The process 900 is similar to the process 800 shown in FIG. 8 and comprises additional steps 902 and 904. In these embodiments, a plurality of unlocking codes and corresponding plurality of access codes are stored in the parcel lock system 100.

As described above, if an entered access code corresponds to an unlocking code (step 812), the door 104 is unlocked and a timer is started (step 818). If another access code is inputted (step 904) before the timer ends (step 902), the process 900 goes back to step 812 to check the access code, and if it is verified, restarts the timer (step 818). For example, the courier scans the first parcel (step 810), opens the door and deposits the parcel into the enclosure 102 (step 818). The courier then scans the next parcel (step 904) before the timer ends. Then, the timer is restarted (step 818) for accepting another parcel. This loop continues until the courier deposits the last parcel into the enclosure 102. In this manner, the door 104 remains open without triggering any alarm during the entire parcel-depositing process. Same as the process 800 shown in FIG. 8, the beeping sound and video cameras 302 and 402 remain on during the entire parcel-depositing process while the lockable door 104 is open and unlocked. After the last access code is inputted, the courier finishes the deposit of last parcel into the enclosure 102 and closes the door 104 before the timer ends. The control circuitry 101 checks whether the lockable door 104 is closed (step 822). If yes, the control circuitry 101 locks the lockable door 104 (step 830), stops the beeping sound, and turns off the front and rear video cameras 302 and 402 (step 834). The process 900 then ends (step 836).

In the process 800 shown in FIG. 8, the control circuitry 101 sends a notification message to recipient's personal electronic device 704 to notify the recipient that a parcel is being delivered, when a correct access code is inputted into the parcel lock 106. In another embodiment, the control circuitry 101 sends a notification message to recipient's personal electronic device 704 to notify the recipient that a parcel may be delivered when the motion sensor 306 detects a moving object (which may be the courier) at step 806. However, in this embodiment, false notification may be sent to the recipient as the moving object detected by the motion sensor 306 may not necessarily be the courier. In some embodiments, a proximity sensor may be used for preventing false notification.

In above embodiments, the motion sensor 306 activates the front and rear video cameras 302 and 402 when the motion sensor detects a moving object. In an alternative embodiment, the control circuitry 101 activates the front and rear video cameras 302 and 402 when the lockable door 104 is unlocked.

Figure 10A:
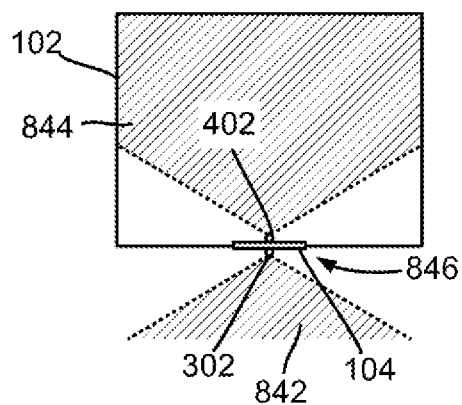
FIGS. 10A and 10B are schematic diagrams showing the field of views (FOVs) of the front and rear video cameras of the parcel lock of the parcel-lock system shown in FIG. 1, when the lockable door is in the closed and open positions, respectively.
Figure 10B:
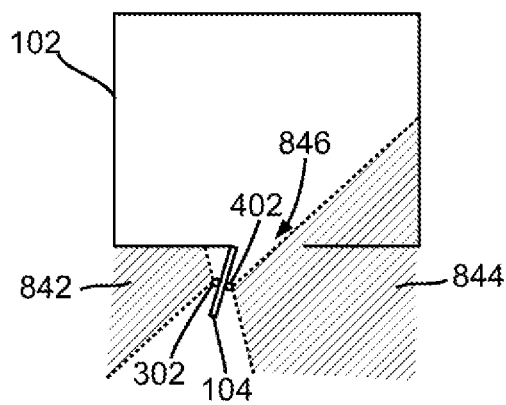

The parcel-lock system 100 thus allows secure delivery of parcels to a recipient. As shown in FIGS. 10A and 10B, by using the front and rear cameras 302 and 402, the parcel-lock system 100 provides field of views (FOVs) 842 and 844 substantively covering (and thus allowing continuous monitoring of) the interior of the enclosure 102, the entrance 846 thereof, and the front exterior of the enclosure 102 about the entrance 846.

FIGS. 11A to 11D illustrate several alternative embodiments comprising different types of cameras at different locations.

Figure 11A:
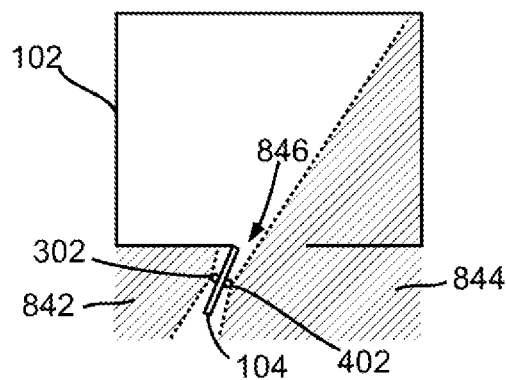
FIGS. 11A to 11D are schematic diagrams of a parcel-lock system, according to some embodiments of this disclosure.

In the embodiment shown in FIG. 11A, the front and rear video cameras 302 and 402 are wide-angle cameras such as cameras with angles of view greater than 100° or fisheye cameras and therefore provide wider FOVs 842 and 844 for better monitoring the interior and exterior of the enclosure 102 about the entrance 846.

Figure 11B:
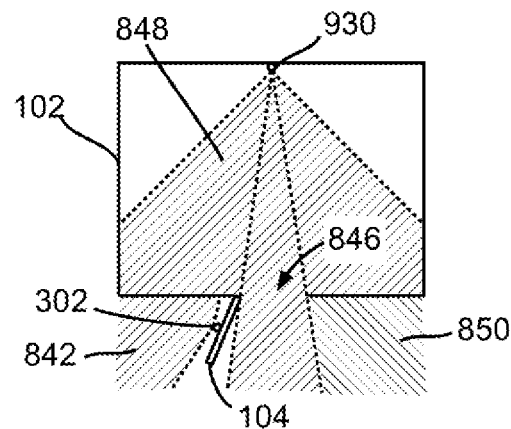

In the embodiment shown in FIG. 11B, the parcel-lock system 100 does not comprise the rear vide camera 402 installed on the door 104. Instead, the parcel lock system 100 comprises a video camera 930 installed in the interior of the enclosure 102 (e.g., an interior wall of a house). The FOVs 842 and 850 of the front video camera 302 and the interior video camera 930 allow monitoring of the interior of the enclosure 102, the entrance 846, and a portion of the front exterior about the entrance 846. However, another portion 850 of the front exterior about the entrance 846 is unmonitored.

Figure 11C:
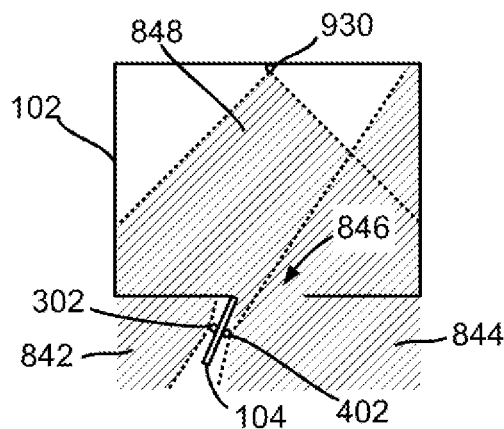

In the embodiment shown in FIG. 11C, the parcel lock system 100 comprises the front and rear video cameras 302 and 402 on the door 104 and another video camera 930 in the enclosure 102 for providing enhanced monitoring. In comparison to the embodiment shown FIG. 11A, the parcel lock system 100 in this embodiment provides larger monitored area inside the enclosure 102.

Figure 11D:
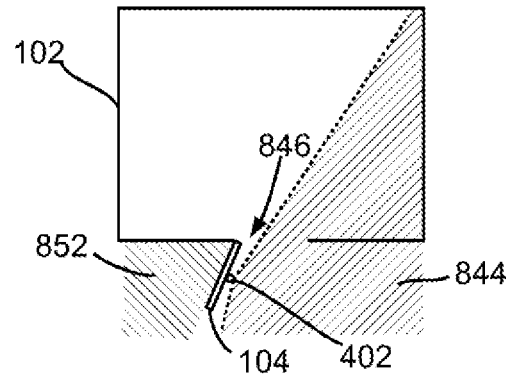

As shown in FIG. 11D, the parcel lock system 100 in this embodiment does not comprise any front video camera 302. The parcel lock system 100 only comprises a rear video camera 402 for monitoring the entrance 846 and a portion of the interior and front exterior of the enclosure 102 adjacent the entrance 846. The area 852 of the front exterior of the enclosure 102 behind the opened door 104 is unmonitored. However, this area 852 may be considered less important as it is not directly accessible to the entrance 846.

Figure 12A:
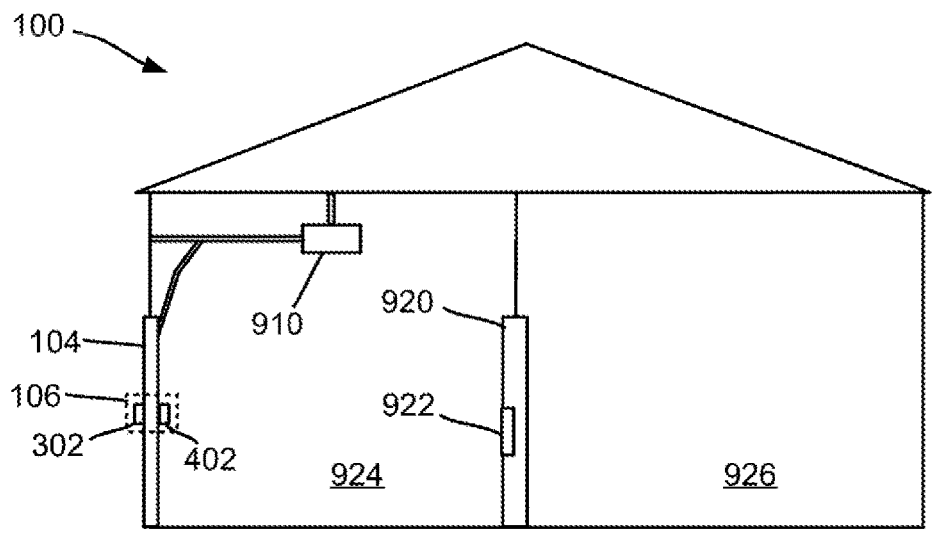
FIGS. 12A to 12C are schematic diagrams of a parcel-lock system installed to garage of a house, according to some embodiments of this disclosure.
Figure 12B:
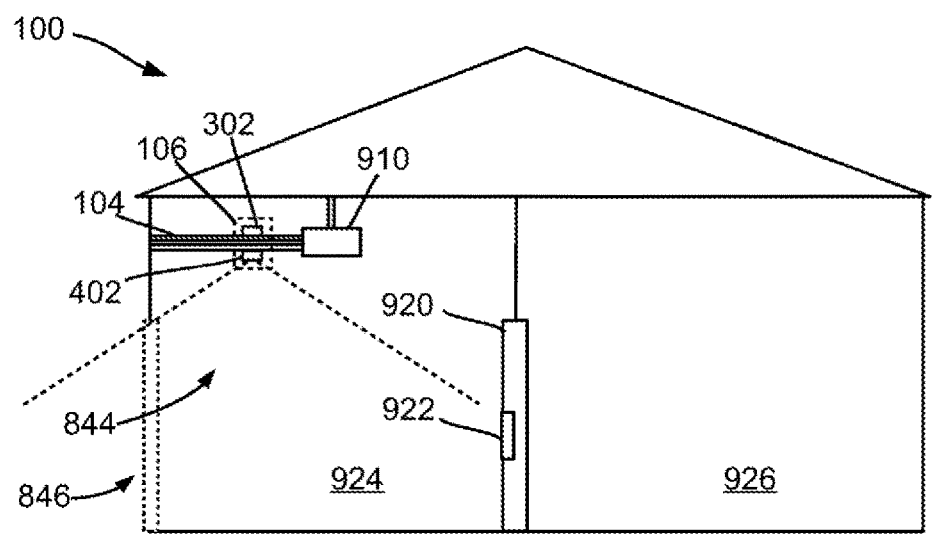
Figure 12C:
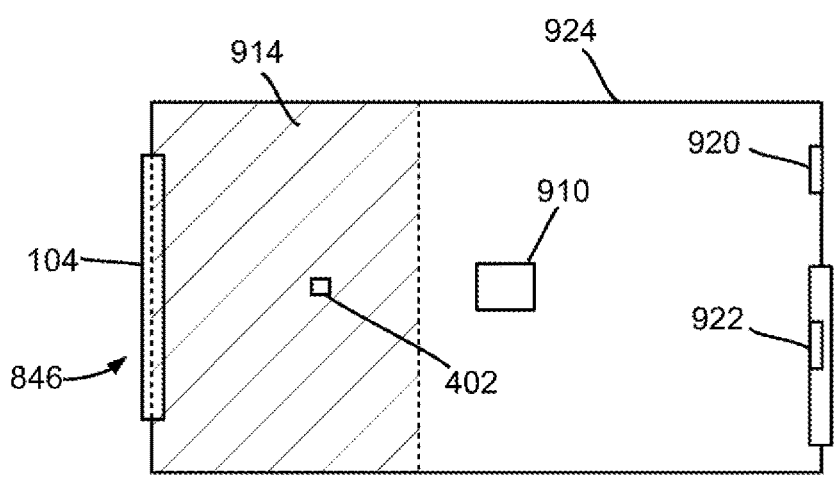

FIGS. 12A to 12C illustrate another embodiment of the parcel lock system 100. As shown in FIG. 12A, the enclosure 102 in this embodiment is a garage 924 and the door 104 is an upwardly openable garage-door thereof. The parcel lock 106 is installed on the garage door 104 and is in communication with the garage door opener 910 via a suitable wired or wireless communication link (e.g., a wired connection therebetween, WIFI® (WI-FI is a registered trademark of Wi-Fi Alliance, Austin, Tex., USA), BLUETOOTH® (BLUETOOTH is a registered trademark of Bluetooth Sig Inc., Kirkland, Wash., USA), ZIGBEE® (ZIGBEE is a registered trademark of ZigBee Alliance Corp., San Ramon, Calif., USA), 3 G, 4 G and/or 5 G wireless mobile telecommunications technologies, and/or the like). The parcel lock 106 is also in communication with a second electronically controllable lock 922 installed on an interior door 920 of the garage 924 with access to the inside of the house 926. In this embodiment, the parcel lock 106 does not comprise the above-described cylinder/bolt door-lock actuation structure. Rather, the garage door opener 910 acts as an actuation structure for locking/unlocking and opening/closing the garage door 104.

When the parcel lock 106 verifies or confirms the correctness of the access code inputted by the courier and unlocks the garage door 104 thereafter, the parcel lock 106 automatically communicates with the second lock 922 to lock and/or close the interior door 920, therefore preventing the courier from entering the inside of the house 926 through the interior door 920 from the garage 924. Then, the parcel lock 106 commands the garage door opener 910 to upwardly open the garage door 104.

As shown in FIG. 12B, the garage door 104 is lifted by the garage door opener 910 to an overhead open position. At this position, although the front video camera 302 faces upwardly, the rear video camera 402 faces downwardly and provides a FOV 844 covering substantively the entirety of the interior of the garage 924, the entrance 846, and the front exterior of the garage 924 about the garage door 104.

As shown in FIG. 12C, the parcel lock system 100 in this embodiment also defines a delivery area 914 in the garage 924 adjacent the entrance 846 as an area that only allows the courier to access. In some embodiments, the delivery area 914 may be highlighted with visible marks to notify the courier. The parcel lock system 100 uses the rear video camera 402 for monitoring the garage 924 and ensuring that the courier only accesses a predefined delivery area 914 in the garage 924. As those skilled in the art will appreciate, the delivery area 914 in the garage 924 may be a predefined area and may be customized by an authorized user.

Figure 13:
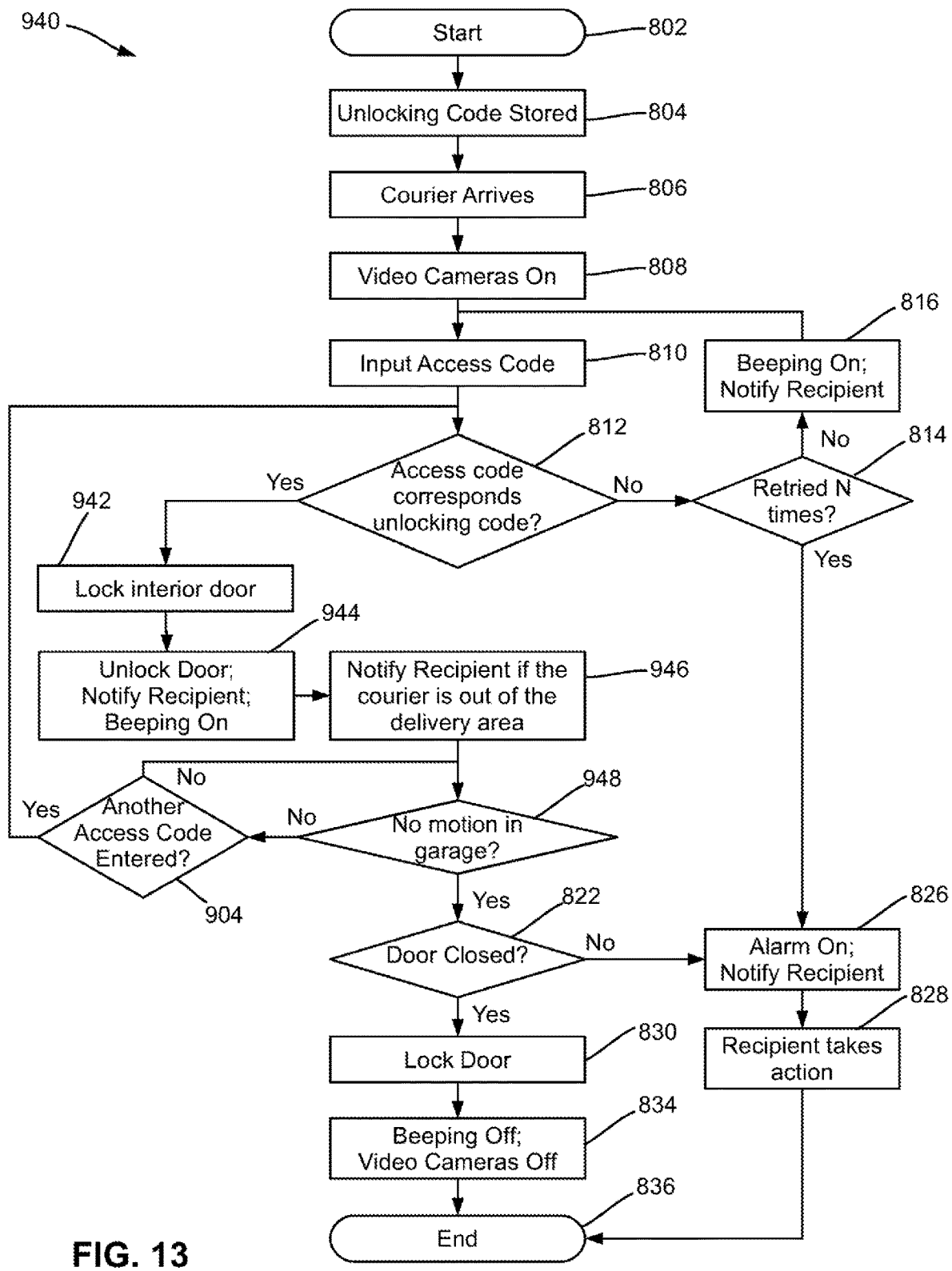
FIG. 13 is a flowchart showing the steps of a process for depositing an item into the garage shown in FIG. 12A, according to one embodiment of this disclosure.

FIG. 13 is a flowchart showing the steps of a process 940 for depositing an item into an enclosure such as the garage 924 having an exterior door 104 and an interior door 920 (e.g., as shown in FIGS. 12A to 12C), according to one embodiment of the disclosure. The process is generally similar to processes 800 and 900 shown in FIGS. 8 and 9 with some additional steps.

The process begins an item is to be delivered to the recipient (step 802). At step 804, an unlocking code is generated and stored in the parcel lock 106.

When the courier arrives (step 806), the motion sensor 306 senses the courier and activates the front and rear video cameras 302 and 402 to start recording the activity of the courier (step 808). The recipient, who may not be nearby, may receive a notification from the parcel-lock system 100 and choose to start viewing the video simultaneously and remotely on his or her personal electronic device 704 such as a smartphone or computer.

At step 810, the courier inputs the access code. After the control circuitry 101 verifies that of the access code matches the unlocking code (step 812), the control circuitry 101 communicates with the second electronically controllable lock 922 to lock the interior door 920 (step 942).

Then, the control circuitry 101 commands the garage door opener 910 to open the garage door 104 and sends a notification message to recipient's personal electronic device 704 to notify the recipient that a parcel is being delivered (step 944; similar to step 818 in FIGS. 8 and 9). In this embodiment, no timer is started at step 944.

The rear video camera 402 (now positioned as an overhead camera inside garage 924) senses and monitors the courier, e.g., by detecting the courier using objection/human recognition and/or face recognition. If the courier is outside the predefined delivery area 914 of garage 924 (see FIG. 12C), the control circuitry 101 sends an alarm message to the recipient and/or trigger an alarm in and/or around the enclosure 102 (step 946).

While the rear video camera 402 detects the courier (step 948), the courier may choose to enter another access code (step 904) as described above to further deliver another item.

After a pre-defined time period during which the rear video camera 402 does not detect the courier and/or does not detect any motion thereof (step 948), the control circuitry 101 checks whether the lockable door 104 is closed (step 822). The rest of the process 940 is the same as the process 900 shown in FIG. 9.

In an embodiment similar to that shown in FIG. 13, when the courier enters an access code matching the unlocking code (step 812) and before locking the interior door 920 (step 942), the parcel lock system 100 notifies the recipient and establishes an audio and/or video communication between the parcel lock 106 and the electronic device of the recipient to allow the courier to talk to the recipient. The recipient may send the parcel lock system 100 an instruction to allow the parcel lock system 100 to continue the process 940 (from step 942) or another instruction to reject the courier's request without opening the garage door 104.

Figure 14A:
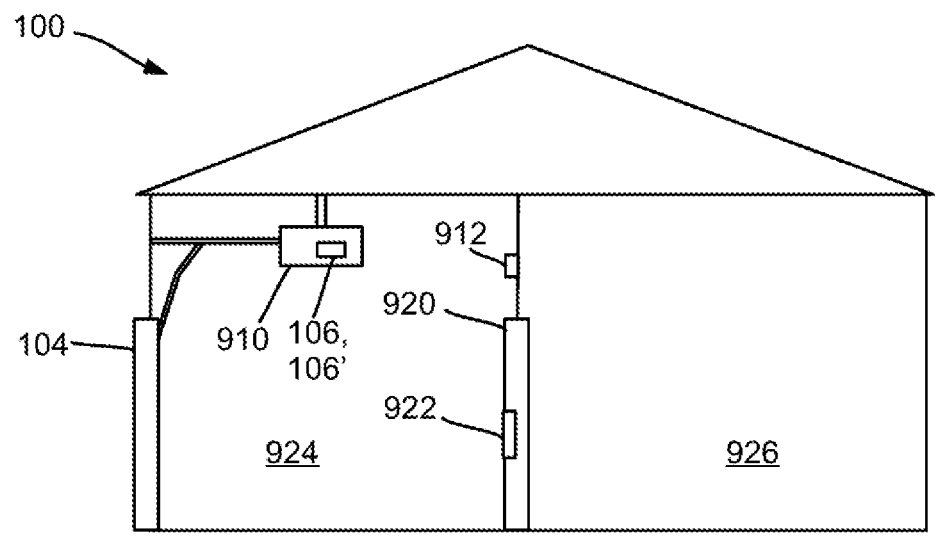
FIGS. 14A and 14B are schematic diagrams of a parcel-lock system installed to garage of a house, according to another embodiment of this disclosure.
Figure 14B:
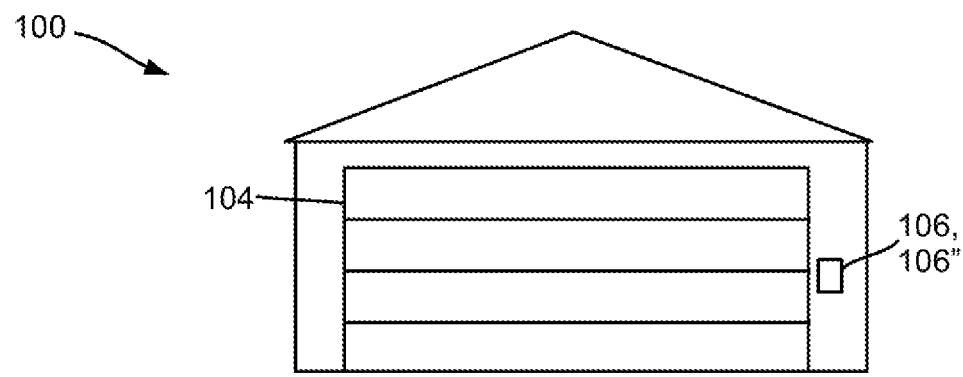

FIGS. 14A and 14B illustrate another embodiment of the parcel lock system 100 which is similar to that shown in FIGS. 12A to 12C. However, in this embodiment, the front portion 106' of the parcel lock 106 (see FIG. 3) is installed on an exterior side of the garage 924 beside the garage door 104 and the rear portion 106" of the parcel lock 106 (see FIG. 4) is installed on or integrated with the garage door opener 910. The front and rear portions 106' and 106" of the parcel lock 106 are in communication with each other via a wired or wireless communication link.

In this embodiment, the parcel lock system 100 also comprise a detector 912 such as an imaging device, a motion sensor, and/or the like in the garage 924 for monitoring the courier's movement in the garage 924 and ensuring that the courier only accesses the delivery area 914 in the garage 924.

The process for depositing an item into the garage 924 in this embodiment is similar to the process 940 shown in FIG. 13 wherein at this step 944, the control circuitry 101 also activates the detector 912 and security video cameras (if any) inside the garage 924.

In some embodiments similar to that shown in FIGS. 12A to 14B, the garage 924 is not accessible to the house 926 and thus does not comprise the interior door 920. Correspondingly, the process 940 does not comprise the step 942.

In above embodiments, the door-status detection structure comprises an imaging device acting as a mark sensor 514 for detecting an optical micro-mark 614 for determining the door status (open or closed). In alternative embodiments, the micro-mark 614 and the mark sensor 514 may be other suitable structures. For example, in one embodiment, the micro-mark 614 may be a radio-frequency identification (RFID) tag and the mark sensor 514 may be RFID reader. In another embodiment, the door-status detection structure may comprise a contact switch for detecting the door status. In yet another embodiment, the door-status detection structure may comprise an imaging device such as a camera capturing images of the entrance for determining the door status.

Although embodiments have been described with reference to the accompanying drawings, those of skill in the art will appreciate that variations and modifications may be made without departing from the scope thereof as defined by the appended claims.

What is claimed is:

1. An apparatus installable to a lockable door of an enclosure at an entrance thereof for receiving one or more delivery items into the enclosure, the apparatus comprising and integrating:
   a front input structure for installing on the lockable door on a first side thereof corresponding to an exterior of the enclosure;
   a first imaging component for installing on the lockable door on a second side thereof corresponding to an interior of the enclosure;
   an actuation structure for installing on the lockable door for locking and unlocking the lockable door; and a control circuitry for installing on the lockable door for functionally coupling to the first imaging component, the front input structure, and the actuation structure, the control circuitry being configured for:
  storing one or more unlocking codes;
  receiving an access code from a visitor via the front input structure;
  determining that the access code corresponds to one of the one or more unlocking codes;
  commanding the actuation structure to unlock the lockable door for receiving the one or more delivery items into the enclosure;
  activating the first imaging component for monitoring the entrance and at least a first portion of the exterior of the enclosure adjacent a first side of the entrance; and
a door-status detection structure for detecting a status of the lockable door;
wherein the door-status detection structure comprises a door-status sensor and a mark detectable by the door-status sensor; and
wherein one of the door-status sensor and the mark is installable on the lockable door and the other one of the door-status sensor and the mark is installable on a doorjamb associated with the lockable door.

2. The apparatus of claim 1, wherein the front input structure comprises at least one of a second imaging component for detecting an image encoding the access code, and a first keyboard for entering the access code.

3. The apparatus of claim 2 further comprising a third imaging component installable on the first side of the lockable door for functionally coupling to the control circuitry for monitoring a second portion of the exterior of the enclosure.

4. The apparatus of claim 3 further comprising at least one of a front display for displaying user instructions to the visitor, a front motion sensor, a first speaker installable on the first side of the lockable door, a first microphone installable on the first side of the lockable door, a rear display for displaying images captured by the third imaging component, a second speaker installable on the second side of the lockable door, and a second microphone installable on the second side of the lockable door.

5. The apparatus of claim 1 further comprising a rear input structure for receiving one or more codes for generating the one or more unlocking codes, said rear input structure being installable on the second side of the lockable door.

6. The apparatus of claim 5, wherein the rear input structure comprises at least one of a fourth imaging component for detecting one or more images for storing the one or more unlocking codes in the apparatus, and a second keyboard for entering the information for storing the one or more unlocking codes in the apparatus.

7. The apparatus of claim 1, wherein the control circuitry is configured for monitoring a predefined area in the enclosure accessible to the visitor and for generating an error output if the visitor in the predefined area has moved out of the predefined area.

8. The apparatus of claim 7, wherein the lockable door is upwardly openable or is openable into the exterior of the enclosure; and wherein the control circuitry is configured for monitoring the predefined area in the enclosure using the first imaging component.

9. The apparatus of claim 1, wherein the control circuitry is configured for commanding the actuation structure to lock the lockable door after a predefined period of time since said unlocking the lockable door.

10. The apparatus of claim 9, wherein the control circuitry comprises a timer for counting the predefined period of time; and
wherein the control circuitry is further configured for:
  restarting the timer if another access code is inputted.

11. A method for receiving one or more delivery items into an enclosure having a lockable door at an entrance thereof, the method comprising:
  storing one or more unlocking codes in an apparatus coupled to the door, the apparatus comprising a door-status detection structure;
  receiving, by the apparatus, an access code from a visitor;
  determining, by the apparatus, that the access code corresponds to one of the one or more unlocking codes;
  unlocking, by the apparatus, the lockable door for receiving the one or more delivery items into the enclosure;
  monitoring, by the apparatus, the entrance and at least a first portion of the exterior of the enclosure adjacent a first side of the entrance using a first imaging component installed on the lockable door on a side thereof corresponding to the interior of the enclosure; and
  detecting, by the door-status detection structure, the status of the lockable door;
  wherein the door-status detection structure comprises a door-status sensor and a mark detectable by the door-status sensor; and
  wherein one of the door-status sensor and the mark is installable on the lockable door and the other one of the door-status sensor and the mark is installable on a doorjamb associated with the lockable door.

12. The method of claim 11 further comprising:
monitoring a predefined area in the enclosure accessible to the visitor; and
generating an error output if the visitor in the predefined area has moved out of the predefined area.

13. The method of claim 11 further comprising:
checking, before said unlocking the lockable door, whether another door of the enclosure is locked; and
locking the another door if the another door is not locked.

14. One or more non-transitory computer-readable storage devices comprising computer-executable instructions for storing in an apparatus coupled to a lockable door of an enclosure at an entrance thereof for receiving one or more delivery items into the enclosure, the apparatus comprising a door-status detection structure, wherein the instructions, when executed, cause a processing structure to perform actions comprising:
  storing one or more unlocking codes in the apparatus;
  receiving, by the apparatus, an access code from a visitor;
  determining, by the apparatus, that the access code corresponds to one of the one or more unlocking codes;
  unlocking, by the apparatus, the lockable door for receiving the one or more delivery items into the enclosure; and
  monitoring, by the apparatus, the entrance and at least a first portion of the exterior of the enclosure adjacent a first side of the entrance using a first imaging component installed on the lockable door on a side thereof corresponding to the interior of the enclosure; and
  detecting, by the door-status detection structure, the status of the lockable door;
  wherein the door-status detection structure comprises a door-status sensor and a mark detectable by the door-status sensor; and
  wherein one of the door-status sensor and the mark is installable on the lockable door and the other one of the door-status sensor and the mark is installable on a doorjamb associated with the lockable door.

15. An apparatus installable to a lockable door of an enclosure at an entrance thereof for receiving one or more delivery items into the enclosure, the apparatus comprising:
- a front input structure for installing on the lockable door on a first side thereof corresponding to an exterior of the enclosure;
- a first imaging component for installing on the lockable door on the first side thereof;
- a second imaging component for installing on the lockable door on a second side thereof corresponding to an interior of the enclosure;
- an actuation structure for installing on the lockable door for locking and unlocking the lockable door;
- a door-status detection structure for detecting a status of the lockable door;
- wherein the door-status detection structure comprises a door-status sensor and a mark detectable by the door-status; and
- wherein one of the door-status sensor and the mark is installable on the lockable door and the other one of the door-status sensor and the mark is installable on a doorjamb associated with the lockable door; and
- a control circuitry for installing on the lockable door for functionally coupling to the first imaging component, the front input structure, and the actuation structure, the control circuitry being configured for:
- storing one or more unlocking codes;
- receiving an access code from a visitor via the front input structure;
- determining that the access code corresponds to one of the one or more unlocking codes;
- commanding the actuation structure to unlock the lockable door for receiving the one or more delivery items into the enclosure;
- activating the first imaging component and/or the second imaging component for monitoring the entrance, at least a first portion of the exterior of the enclosure adjacent a first side of the entrance, and/or at least a portion of the interior of the enclosure; and
- detecting the status of the lockable door.

16. The apparatus of claim 15, wherein the front input structure comprises at least one of a third imaging component for detecting an image encoding the access code, and a first keyboard for entering the access code.

17. The apparatus of claim 16, further comprising a fourth imaging component installable on the first side of the lockable door for functionally coupling to the control circuitry for monitoring a second portion of the exterior of the enclosure.

18. The apparatus of claim 15, wherein the control circuitry is configured for monitoring a predefined area in the enclosure accessible to the visitor and for generating an error output if the visitor in the predefined area has moved out of the predefined area.

19. The apparatus of claim 18, wherein the lockable door is upwardly openable or is openable into the exterior or interior of the enclosure; and wherein the control circuitry is configured for monitoring the predefined area in the enclosure using the first imaging component and/or the second imaging component.

* * * * *